(12) United States Patent
Santicchi

(10) Patent No.: US 7,350,639 B2
(45) Date of Patent: Apr. 1, 2008

(54) DEVICE FOR THE TRANSFER OF GARMENT

(75) Inventor: Augusto Santicchi, San Sisto (IT)

(73) Assignee: Immobiliare Metalprogetti S.r.L., Perugia (IT)

( * ) Notice: Subject to any disclaimer, the term of this patent is extended or adjusted under 35 U.S.C. 154(b) by 44 days.

(21) Appl. No.: 10/558,049

(22) PCT Filed: Jul. 23, 2004

(86) PCT No.: PCT/IT2004/000406

§ 371 (c)(1),
(2), (4) Date: Nov. 22, 2005

(87) PCT Pub. No.: WO2005/014446

PCT Pub. Date: Feb. 17, 2005

(65) Prior Publication Data

US 2007/0068773 A1    Mar. 29, 2007

(30) Foreign Application Priority Data

Aug. 7, 2003   (IT)   ............................ PS2003A0031

(51) Int. Cl.
*B65G 37/00*  (2006.01)
(52) U.S. Cl. ............................... 198/465.4; 198/466.1; 198/660

(58) Field of Classification Search ............. 198/465.4, 198/486.1, 660, 680, 488.1
See application file for complete search history.

(56) References Cited

U.S. PATENT DOCUMENTS 5,927,472 A * 7/1999 Neef et al. ............... 198/465.4
6,460,685 B1 * 10/2002 Johansson et al. ....... 198/465.4

FOREIGN PATENT DOCUMENTS

| DE | 3834576 A1 | * | 4/1990 |
| WO | WO 8400349 A1 | * | 2/1984 |
| WO | WO 9110610 A1 | * | 7/1991 |

* cited by examiner

*Primary Examiner*—Gene O. Crawford
*Assistant Examiner*—Kavel Singh

(57) ABSTRACT

This patent application concerns a device for the collection, transfer and automatic unloading, using a single actuator, of garment hangers between two adjacent overhead transport lines (A, B), of the sort that are commonly used in the clothing industry or in their storage or shipment warehouses, where the handling of the garments from one operating station to an other occurs by means of closed loop overhead transport lines, on which the garments are hung each with a garment hanger. This device uses guide rails (9, 10) specially profiled where the hanger is collected and a special hook-carrier trolley (2) with a pair of rams (6a) suited to cooperate with appropriate matching cams.

2 Claims, 3 Drawing Sheets

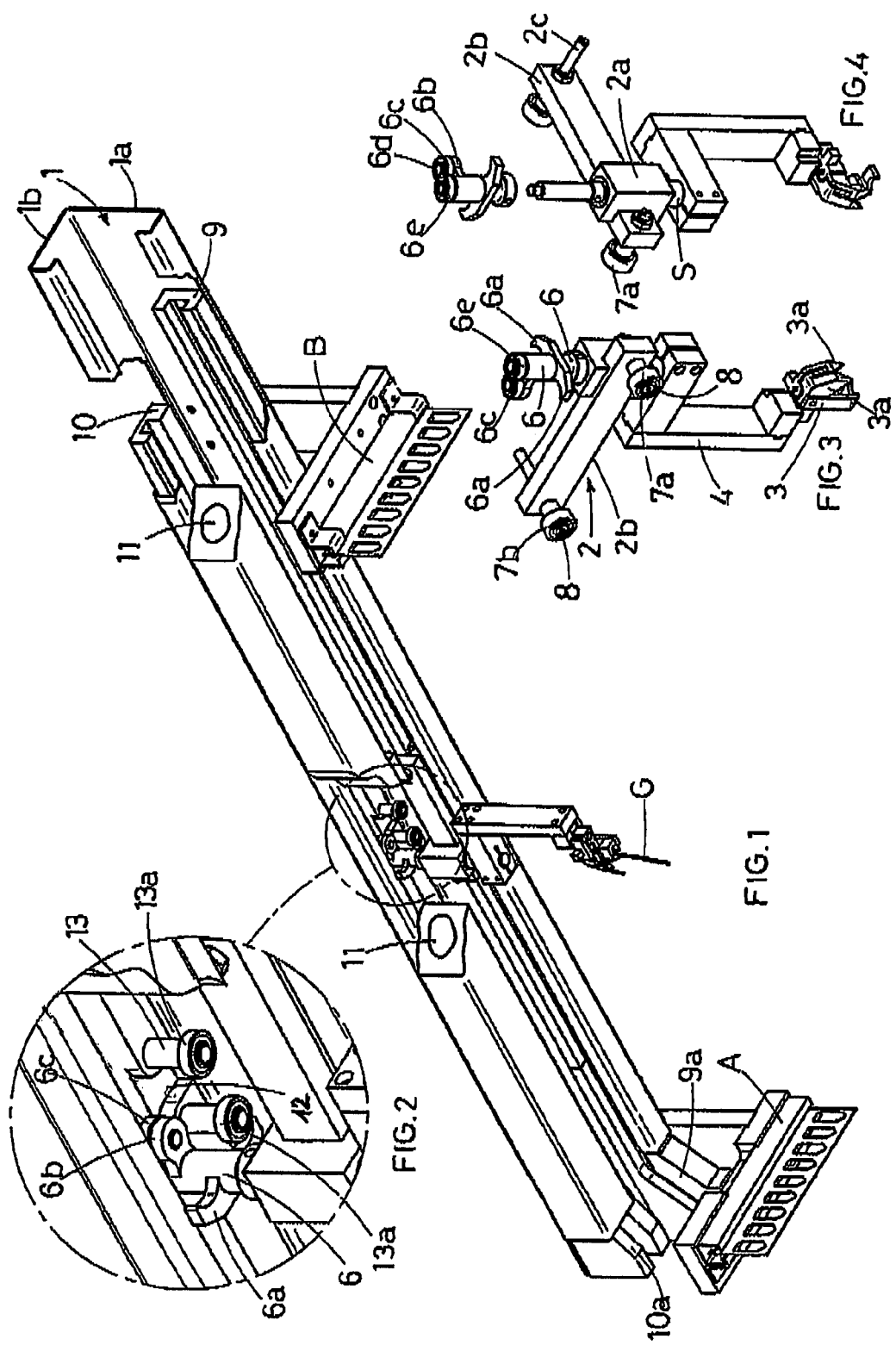

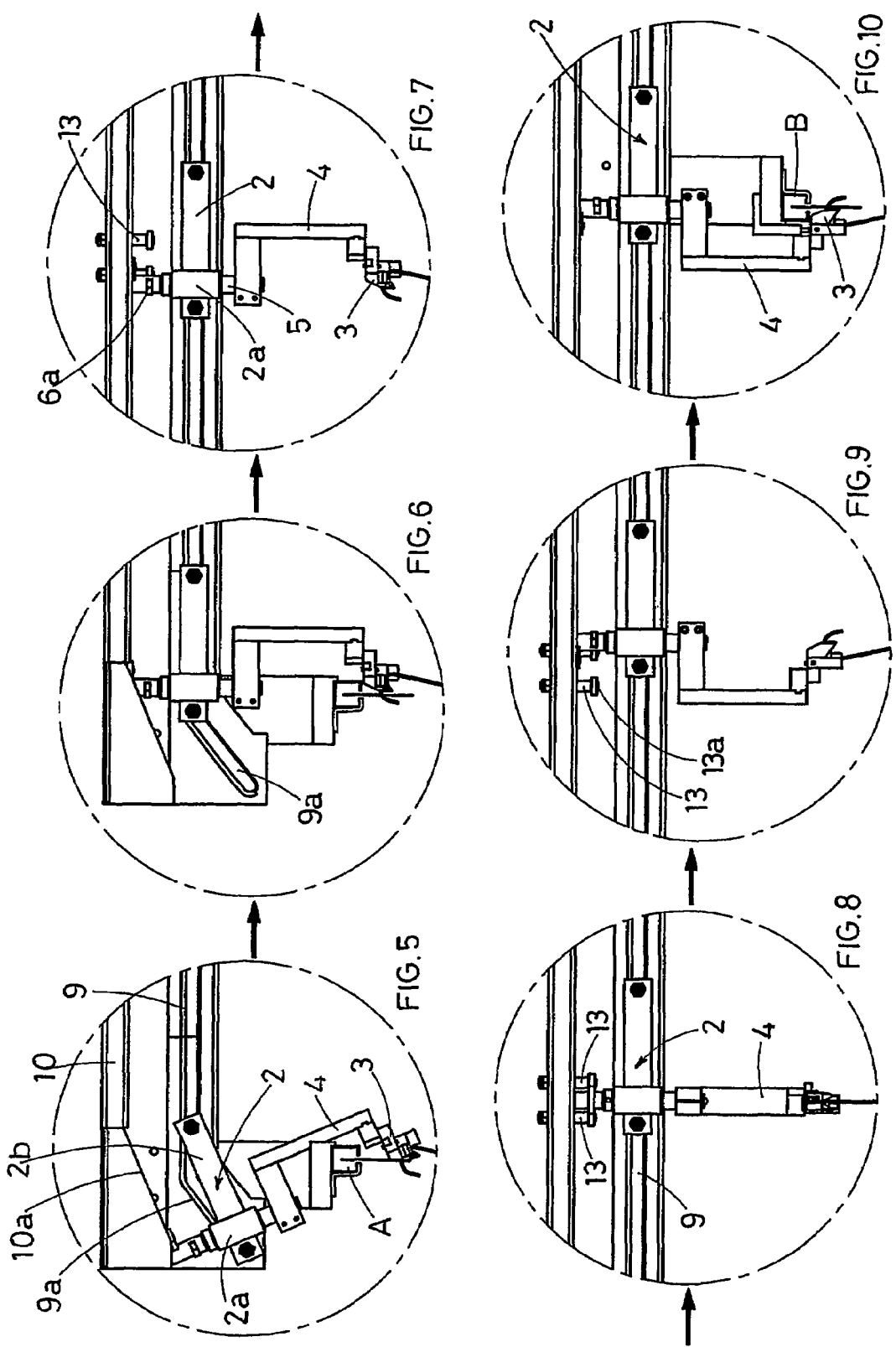

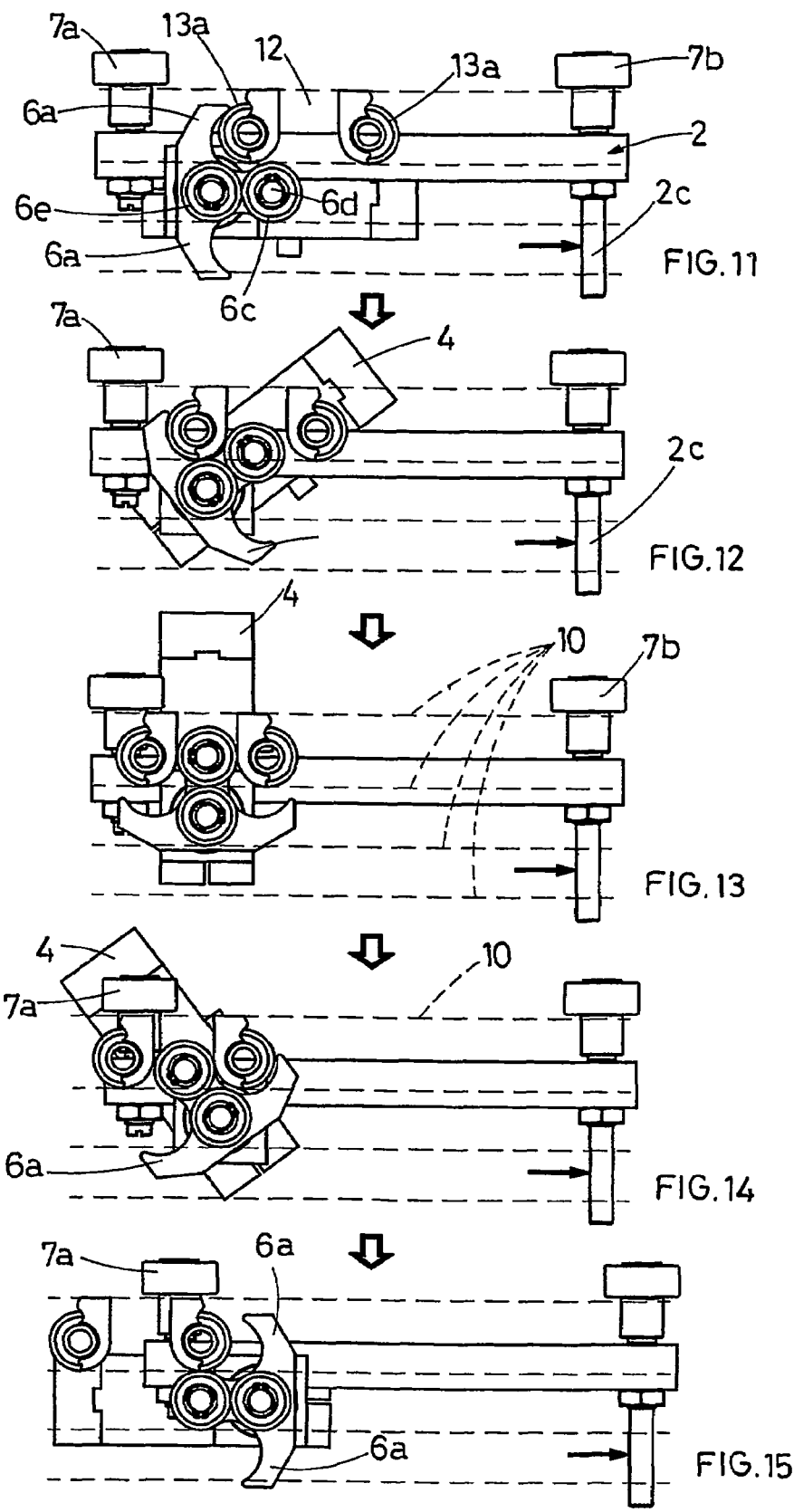

DEVICE FOR THE TRANSFER OF GARMENT

This patent application concerns a device for the collection, transfer and automatic unloading, using a single actuator, of garment hangers between two adjacent overhead transport lines, of the sort that are commonly used in the clothing industry or in their storage or shipment warehouses, where the handling of the garments from one operating station to an other occurs by means of closed loop overhead transport lines, on which the garments are hung each with a garment hanger, whose hook can be put into anyone of the uninterrupted series of slots that have been cut out of the mobile part of the said transport systems.

In order to be able to transfer at great speed big quantities of garments between two adjacent transport lines, automatic equipment has already been created which is usually called "transfer device" in jargon, which is able to collect one hanger at a time from a first transport line and unload it on a second transport line alongside the first one, bringing about during the transfer phase also the necessary 180° rotation to the hanger, in order that the hanger's hook now faces with its concave and open extremity the slot on which it is to be loaded. These already known transfer devices basically consist of a supporting frame made of a horizontal framework that has to be place transversally and above the two overhead lines between which the garment transfer is to take place.

This framework acts as a support rail and guide for a trolley, to which is suspended the hanger hook seizing hook, made of two vertical grips capable of clutching the hanger hook at the top of its hook-shaped part.

In order to perform this task, the hook has to be carried in various motions, apart from the backward-and-forward motion between the two overhead lines which are side by side; as already mentioned, the hook has to rotate 180° on a vertical axis, in order to turn the hanger hook round during the transfer.

Then, in the hanger collection phase, this hook has to be first lowered above the hook-shaped part of the hook, in order to allow it to be clutched by the above-mentioned pair of grips, and then raised again and moved back at the same time to retrieve the hook-shaped part from the slot it is hanging in.

Having said that, it is important to point out that on the existing transfer device models, every hook motion is due to a specific pneumatic or electric actuator indeed, there is one actuator for the rotation of the hook around a vertical axis, and another actuator for the hook's vertical rectilinear motion, while obviously a third actuator has to be used for the backward and forward transport of the said hook-carrier trolley along the said framework.

The aim of the present invention is to implement a device for the collection, transfer and automatic unloading of garment hangers between two adjacent overhead transport lines using only a single actuator, and precisely the one in control of the hook-carrier trolley motion, in order to make the implementation of the said transfer devices more cost-effective while making them at the same time more reliable, the said actuators and corresponding starting and stopping sensors being the components that require most attention for setting and maintenance.

In order to achieve the above-mentioned aim, the transfer device, according to the invention, uses a guide rail which is specially profiled in its final section on the side where the hanger is collected, and a special hook-carrier trolley with a pair of modeled rams suited to cooperate with appropriate matching cams to be found, if necessary, along the said rail.

More precisely, during the alternate strokes of the trolley, carried by the corresponding actuator, which is the only one to be used, the motion of the hook in the hanger hooking and collection phase, is due to the said special rail modelling, while the 180° hook rotation is due to the interference between the said rams and the said cams, placed on the central line of the said rail.

For major clarity the description of the device according to the invention continues with reference to the enclosed drawings, intended for purposes of illustration and not in a limiting sense, where:

FIG. 1 shows, with an axonometric projection, the device according to the invention, seen from below;

FIG. 2 is a blown-up drawing of a detail of FIG. 1;

FIGS. 3 and 4 show, seen from two different angles, the hook-carrier trolley which is and integral part of the device according to the invention;

FIGS. 5 to 10 are side views of the above-mentioned hook-carrier trolley, shown in different positions during the hook-carrier trolley stroke, which corresponds to the collection and transfer of a hanger from one transport line to the other;

FIGS. 11 to 15 are plan views of the above-mentioned hook-carrier trolley, shown in different positions during the hook-carrier trolley stroke, which corresponds to the collection and transfer of a hanger from one transport line to the other.

With reference to the said figures, the transfer device, according to the invention, is of the sort that includes a supporting frame consisting of a horizontal framework (1) that has to be placed transversally and above the two overhead lines (A and B) between which the garment transfer is to take place.

The said framework (1) acts as a support and guide rail for a trolley (2), onto which inside is fixed a hook (3) of the known type, made of two vertical grips (3a) capable of clutching the hook (G) of a hanger at the top of its hook-shaped part.

The said hook (3) is fixed to the base of a support "C"-shaped clamp (4); this clamp is itself fixed to a vertical axed pin (5) which rotates freely inside its seat, in the trolley (2) body (2a): indeed part of the said pin (5) goes through the trolley (2) from bottom to top.

With particular reference to FIGS. 3 and 4, it should be noted that on the top final section (5a) of the said free pin (5) is inserted and blocked a collar (6); a pair of opposed and symmetrically modelled rams (6a) protrudes laterally out of the base of this collar, while about halfway up the said collar (6) a small bracket (6b) protrudes; this bracket lies symmetrically to the said pair of rams (6a) with the task of supporting a first ball bearing (6c), inserted on a vertical-axed pin (6d) protruding from the extremity of the said small bracket (6b).

At the top of the said free pin (5), just above the collar (6), there is a second ball bearing (6e), identical to the first ball bearing (6c), which is placed lower than the second ball bearing.

The said trolley (2) also includes a horizontal beam (2b) that goes through the said body (2a) and that supports two wheels (7a and 7b), one at each end, held loosely by corresponding pins (8), horizontal axis, protruding on one side of the said beam (2b).

The framework (1) is made of metal box-shaped profile presenting an overturned L profile, in which two parallel sliding and guide rails (9 and 10) for the trolley (2) are to be found: one is on the side (9), placed on the inside of the side-board (Ia) of the profile, the other is on the top (10), placed with its head below its horizontal side (1b).

These rails (9 and 10) have final sections (9a and 10a) which are parallel and tilted downwards, next to the extremity of the framework (1) that rises above the transport line (A), from which the garments have to be collected to be transfered to the other transport line (B).

The trolley (2)'s free wheels (7a and 7b), with a horizontal axis, are placed and slide inside the side rail (9); the beam (2b) stays outside this rail, and is hooked by means of a horizontal arm (2c) to the actuator (11), in charge of carrying the trolley (2) in alternate strokes along the framework (1).

The said ball bearings (6c and 6e), on the other hand, are both placed and slide inside the top rail (10); it should be reminded that these ball bearings lie on different levels: indeed, the said rail (10) has a guideway which is deep enough to take both ball bearings (6c and 6e) side-by-side.

Attention has to be drawn to the fact that on one of the side-boards of this deep rail (10) there is, near the centre of the framework (1), a niche (12), hollowed out at the height which corresponds to the position of the said ball bearing (6c) which can therefore, in this central point of the framework (1), swerve sideways out of the rail (10). The other ball bearing (6e), on the other hand, can never come out.

It will be made clear in the continuation of the description that the presence of this niche (12) is of fundamental importance for the operating of the transfer device according to the invention.

The said niche (12) is placed between a pair of identical, aligned, symmetrical, fixed vertical axed pins (13), protruding below the rail (10) and bearing the corresponding ball bearings (13a) at their base, placed at the same position and sliding level as the above-mentioned pair of rams (6a), that are therefore bound to interfere with one of the said ball bearings (13a) during every trolley (2) stroke along the framework (1).

FIGS. 7, 8, 11, 12 and 13 show how this interference causes the first 90° rotation of the rotating pin (5), and therefore of the hook (3) fixed to the base of the said pin (5); the second 90° pin rotation is due to the interference between the said ball bearing (6c) and one of the side walls of the said niche (12).

Indeed, during the first 90° pin rotation (5), the above-mentioned ball bearing (6c), not being central compared to the rotation axis of the said pin (5), is forced to swerve sideways and go into the niche (12), from which it goes out straight away to follow the trolley's stroke (2), drawn by the actuator (11).

FIG. 14 shows precisely what happens in this last phase, during which an interference and a sliding between the said ball bearing (6c) and one of the side walls of the said niche (12) takes place, with a consequent application on the pin (5) of a twisting moment, whose arm coincides exactly with the length of the small bracket (2b).

As the said niche acts as a proper matching and guide cam for the ball bearing (6c), it has an opening with perfectly jointed angles, with the same curvature radius as the ball bearing's radius (6c).

Moving on to the detailed description of the hook (G) seizing and collection by the grip hook (3), it is important to note that the body (2a) of the trolley (2) is eccentric compared to the beam (2b) and is indeed shifted near the wheel (7a) placed at the extremity of the said beam, facing the transport line (A) off which the hanger is to be collected for transfer to the other transport line.

Besides, the length of this beam (2b) is such that when the trolley (2) ends its stroke on the transport line side (A), its wheel (7b) does not go down the descending section (9a) of the rail (9), where only the other wheel (7a) goes down.

This means that as long as the wheel (7a) is running inside the descending section (9a), the beam (2b) makes a rotary-translatory motion with the rotation centre on the wheel (7b), as shown in FIG. 5.

The size of the whole trolley and of the hook-carrier clamp (4) is such that to the rotary-translatory motion corresponds a vertical shift of the hook (3) at the moment in which its grips (3a) get to the hook (1) to seize it and go back up immediately afterwards to retrieve it from its hanging position.

The invention claimed is:

1. Device for the collection, transfer and automatic unloading of garment hangers between two adjacent overhead transport lines (A and B), of the sort including a supporting frame consisting of a horizontal support and guide framework (1) for a trolley (2); a hook (3) is fixed below the trolley, consisting of two vertical grips (3a) capable of clutching the hook (G) of a hanger at the top of its hook-shaped part; this device is characterized by:

a trolley (2) consisting of a body (2a) and a horizontal beam (2b) that goes through the body (2a) and that supports at both ends two wheels (7a and 7b), held loosely by corresponding pins (8), horizontal axis, protruding on one side of the said beam (2b);

a hook (3), fixed to the base of a support "C"-shaped claim (4), which is itself fixed to the base of a vertical axed pin (5) which rotates freely inside the trolley (2) body (2a), and on whose final tip section (5a) is inserted and blocked a collar (6); a pair of opposed and symmetrical modeled rams (6a) protrudes laterally out of the base of this collar, while about halfway up the said collar (6) a small bracket (6b) protrudes; this bracket lies symmetrically to the said pair of rams (6a) with the task of supporting a first ball bearing (6c), inserted on a vertical-axed pin (6d) protruding from the extremity of the said small bracket (6b); at the top of the said free pin (5), just above the collar (6), there is a second ball bearing (6e), identical to the first ball bearing (6c), (6);

a framework (1) in which two parallel sliding and guide rails (9 and 10) for the trolley (2) are to be found, one on the side (9), the other on the top (10), both with final sections (9a and 10a) which are parallel and tilted downwards, next to the extremity of the framework (1) that rises above the transport line (A), from which the garments have to be collected to be transferred to the other transport line (B), the following conditions being provided for:

the said trolley's (2) free wheels (7a and 7b) are placed and slide inside the side rail (9); the beam (2b) stays outside this rail, and is hooked by means of a horizontal arm (2c) to the actuator (11), in charge of carrying the trolley (2) in alternate strokes along the framework (1);

the said ball bearings (6c and 6e) are placed and slide inside the top rail (10);

one of the side-boards of this rail (10) bears, near the centre of the framework (1), a niche (12), hollowed out at the height which corresponds to the position of the said ball bearing (6c) that interfere with walls (12a) of the niche (12) during the 90° rotation of pin (5);

said niche is interposed between an aligned symmetric pair of fixed vertical axed pins (13) protruding below the rail (10) and featuring the ball bearings (13a) at a base of each pin placed at the same position and sliding level as the above mentioned pair of rams (6*a*), that are therefore bound to interfere with one of said ball bearings (13*a*) during every trolley (2) stroke along the framework (1), thereby providing a further 90° rotation of the pin;

the said beam (2*b*) has such a length that when the trolley (2) ends its stroke on the transport line side (A), its wheel (7*b*) does not go down the descending section (9*a*) of the rail (9), which means that as long as the wheel (7*a*) is running inside the descending section (9*a*), the beam (2) makes a rotary-translatory motion with the rotation centre on the wheel (7*b*);

the said trolley (2) and the said hook-carrier clamp (4) have such a size that to the rotary-translatory motion or the rail (2*b*) corresponds a vertical shift of the hook (3) at the moment in which the grips (3*a*) get to the hook (1) to seize it and go back up immediately afterwards to retrieve the hook from its hanging seat.

2. A device for the collection, transfer and automatic unloading of garment hangers between two adjacent overhead transport lines (A and B), comprising:

a supporting frame having a horizontal support, a guide framework (1), a trolley (2) mounted on the framework, a hook (3) fixed below the trolley by a vertical pin (5) wherein the hook rotates, the hook having two vertical grips capable of clutching a hook (6) of the garment hanger;

the framework having a side rail (9) and a top rail (10) each rail having final sections (9*a*, 10*a*), the trolley having a beam (2*b*) provided with two free wheels (7*a*,7*b*) for sliding movement along the rails, a body (2*a*) having an eccentric configuration with respect to the beam (2*b*), a collar (6) connected to the trolley, a pair of rams (6*a*) extending laterally from the collar, a small bracket (6*b*) protruding from the collar, a first ball bearing (6*c*) supported by the bracket and a second ball bearing (6*e*) supported by the collar and disposed above the first ball bearing;

a niche (12) formed in the top rail (10), the niche having walls in which the first ball bearing is received, the niche being formed between a first and a second vertical pin (13), an end of the first vertical pin having a third ball bearing (13*a*) mounted thereon, an end of the second vertical pin having a fourth ball bearing (13*a*) mounted thereon;

wherein during sliding of the trolley, the first ball bearing swerves sideways to enter the niche and then proceeds along the rail;

wherein during sliding of the trolley, engagement of the third and fourth ball bearings (13) with the respective rams, provides a 90° rotation of the collar, the hook and the garment hanger, and a further 90° rotation of the collar, the hook and the garment hanger is provided by interference between the first and second ball bearings and the walls of the niche.

* * * * *